(12) United States Patent
Woodsum

(10) Patent No.: US 9,954,563 B2
(45) Date of Patent: Apr. 24, 2018

(54) HERMETIC TRANSFORM BEAM-FORMING DEVICES AND METHODS USING META-MATERIALS

(71) Applicant: VertoCOMM, Inc., Weston, MA (US)

(72) Inventor: Harvey C. Woodsum, Bedford, NH (US)

(73) Assignee: VertoCOMM, Inc., Weston, MA (US)

( * ) Notice: Subject to any disclaimer, the term of this patent is extended or adjusted under 35 U.S.C. 154(b) by 0 days.

(21) Appl. No.: 14/997,407

(22) Filed: Jan. 15, 2016

(65) Prior Publication Data

US 2016/0211906 A1 Jul. 21, 2016

Related U.S. Application Data

(60) Provisional application No. 62/103,910, filed on Jan. 15, 2015.

(51) Int. Cl.
| | |
|---|---|
| *H04B 7/14* | (2006.01) |
| *H04B 1/04* | (2006.01) |
| *H04B 1/18* | (2006.01) |
| *H01Q 3/26* | (2006.01) |
| *H01Q 15/00* | (2006.01) |

(52) U.S. Cl.
CPC ............... *H04B 1/04* (2013.01); *H01Q 3/26* (2013.01); *H01Q 15/0086* (2013.01); *H04B 1/18* (2013.01)

(58) Field of Classification Search
CPC .......... H01Q 3/24; H04B 1/18; H04B 7/0617; H04B 7/0602
USPC ............ 455/25, 19, 63.4, 562.1, 575.7, 121, 455/193.1
See application file for complete search history.

(56) References Cited

U.S. PATENT DOCUMENTS

| | | | |
|---|---|---|---|
| 4,716,417 A | 12/1987 | Grumet | |
| 5,978,530 A | 11/1999 | Russell et al. | |
| 6,958,729 B1 | 10/2005 | Metz | |
| 7,260,370 B2 * | 8/2007 | Wang .................. | H04B 7/0857 375/142 |

(Continued)

OTHER PUBLICATIONS

T.H. Hand and S.A. Cummer, "Controllable Magnetic Metamaterial Using Digitally Addressable Split-Ring Resonators," IEEE Antennas and Wireless Propagation Letters, vol. 8, pp. 262-265 (2009).

(Continued)

*Primary Examiner* — Sonny Trinh
(74) *Attorney, Agent, or Firm* — Wilmer Cutler Pickering Hale and Dorr LLP

(57) ABSTRACT

According to one or more exemplary embodiments, a receiver comprises one or more first metamaterial circuit elements configured to receive a signal; one or more second metamaterial circuit elements configured to perform a hermetic transform on the signal to output a hermetic transform output; and one or more third metamaterial circuit elements configured to perform a summation on the hermetic transform output. Additionally, according to one or more exemplary embodiments, a transmitter comprises a metamaterial waveguide configured to guide a signal and allow the signal to exit the metamaterial waveguide; one or more first metamaterial circuit elements coupled to the metamaterial waveguide and configured to perform a hermetic transform on the signal; and one or more second metamaterial elements configured to transmit the signal.

5 Claims, 6 Drawing Sheets

(56) References Cited

U.S. PATENT DOCUMENTS

| | | | |
|---|---|---|---|
| 8,064,408 B2 | 11/2011 | Woodsum | |
| 8,559,456 B2 | 10/2013 | Woodsum | |
| 8,680,945 B1 | 3/2014 | Wang | |
| 8,816,798 B2 * | 8/2014 | McKinzie, III | H01P 1/16 333/175 |
| 9,154,353 B2 * | 10/2015 | Woodsum | H04L 27/2601 |
| 9,170,348 B2 * | 10/2015 | Abbaspour-Tamijani | G02B 1/002 |
| 9,344,181 B2 * | 5/2016 | Woodsum | H04B 7/086 |
| 9,531,431 B2 * | 12/2016 | Woodsum | H04B 1/7095 |
| 2008/0258981 A1 | 10/2008 | Achour et al. | |
| 2009/0239551 A1 | 9/2009 | Woodsum | |
| 2010/0156573 A1 | 6/2010 | Smith et al. | |
| 2014/0211298 A1 | 7/2014 | Sayyah et al. | |

OTHER PUBLICATIONS

Johnson et al., "Sidelobe Canceling for Optimization of Reconfigurable Holographic Metamaterial Antenna," IEEE Transactions on Antennas and Propagation 8 pages (2014).

H.C. Woodsum and C.M. Woodsum, "Optimized Hermetic Transform Beam-Forming of Acoustic Arrays via Cascaded Spatial Filter Arrangements Derived using a Chimerical Evolutionary Genetic Algorithm," Proceedings of the International Congress on Acoustics, ICA-13, Jun. 2013 (9 pages).

* cited by examiner

HERMETIC TRANSFORM BEAM-FORMING DEVICES AND METHODS USING META-MATERIALS

CROSS-REFERENCE TO RELATED APPLICATIONS

This application claims priority to U.S. Provisional Application No. 62/103,910 filed Jan. 15, 2015 entitled "Hermetic Transform Beam-Forming Devices and Methods Using Meta-Materials," which is herein incorporated by reference in its entirety.

INCORPORATION BY REFERENCE

All patents, patent applications and publications cited herein are hereby incorporated by reference in their entirety.

TECHNICAL FIELD

Aspects of this disclosure generally relate to the field of communications and signal processing. In particular, aspects of this disclosure relate to hermetic transform beam-forming devices and methods using meta-materials.

BACKGROUND

Beamforming techniques are used in conventional antenna systems and other communications devices. For certain applications, it is desirable to achieve a narrower beam (e.g., to allow devices to be smaller). Thus, there is a need in the art for improved receivers, transmitters, and other communications devices that can provide one or more narrow beams, for example to allow frequency re-use in a multi-user environment, and to improve gain against ambient noise by rejecting noise and interfering signals outside a given beam, among other advantages. The beam-width of an antenna or antenna array is normally limited by the diffraction pattern, which normally constrain arrays capable of generating or receiving narrow beams of radio-frequency (or acoustic) energy to be large as compared to the radiation wavelength. The techniques of Hermetic Transform beam-forming disclosed herein allow the diffraction pattern limits to be overcome.

SUMMARY OF EXEMPLARY EMBODIMENTS

In one or more exemplary embodiments, a receiver comprises one or more first metamaterial circuit elements configured to receive a signal; one or more second metamaterial circuit elements configured to perform a hermetic transform on the signal to output a hermetic transform output; and one or more third metamaterial circuit elements configured to perform a summation on the hermetic transform output.

In one or more exemplary embodiments, the one or more second metamaterial circuit elements comprise one or more phase shifters for performing phase shifts and one or more amplitude scalers for performing amplitude scaling, the combined effect of which corresponds to the hermetic transform. In one or more exemplary embodiments, the one or more third metamaterial circuit elements comprises at least one of a metamaterial lens or reflector. In one or more exemplary embodiments, the signal is an RF signal. In one or more exemplary embodiments, the signal is an acoustic signal.

In one or more exemplary embodiments, a transmitter comprises a metamaterial waveguide configured to guide a signal and allow the signal to exit the metamaterial waveguide; one or more first metamaterial circuit elements coupled to the metamaterial waveguide and configured to perform a hermetic transform on the signal; and one or more second metamaterial elements configured to transmit the signal.

In one or more exemplary embodiments, the one or more first metamaterial circuit elements comprise one or more phase shifters for performing phase shifts and one or more amplitude scalers for performing amplitude scaling, the combined effect of which corresponds to the hermetic transform. In one or more exemplary embodiments, the signal is an RF signal. In one or more exemplary embodiments, the signal is an acoustic signal.

These and other aspects and embodiments of the disclosure are illustrated and described below.

DETAILED DESCRIPTION OF EXEMPLARY EMBODIMENTS

Figure 1:
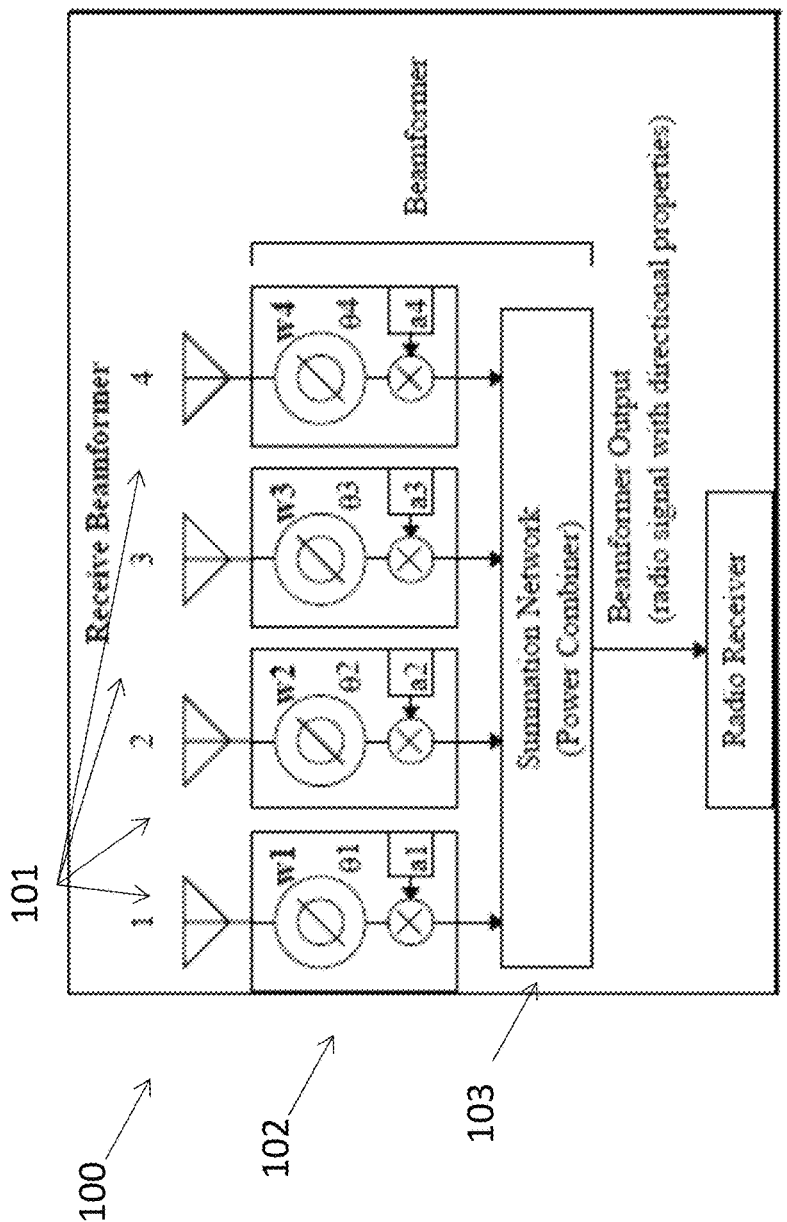
FIG. 1 illustrates a phased-array received beam-forming system according to one or more exemplary embodiments according to an exemplary embodiment.

The present disclosure relates to antenna arrays, and to beam-forming of such arrays in order to create directional transmitting and/or receiving systems, and to the creation of such beam-forming through the combination of specialized materials known as meta-materials, with specialized architectures known as Hermetic Transforms.

One or more exemplary embodiments use antenna arrays making use of a special class of synthetically constructed materials known as meta-materials to construct devices that perform Hermetic Transform Beam-Forming. Hermetic Transform Beam-Forming is described further in [1-2].

Metamaterials for radio frequency (RF) antenna arrays are constructed using circuit elements that are tiny compared to the wavelengths involved, thus appearing to waves propagating within and on the antenna as a continuous medium. The network of elements can be connected and controlled electrically in order to modify properties of the synthetic "material", allowing it to create properties that do not exist in natural materials, for example negative index of refraction. In the case of RF antenna arrays, metamaterials can often be constructed using standard circuit printing technology.

Hermetic Transforms are similar in function to Fourier Transforms, but having inherently higher resolution. In order to achieve this resolution advantage, the array aperture is spatially sampled with inter-element spacing much less than the spatial Nyquist interval (½ wavelength). Such spatial oversampling is especially easy to accomplish using meta-materials, because of the small antenna element device size.

In one or more exemplary embodiments, combining the unique aspects of metamaterials and the unique aspects of Hermetic Transform Beam-Forming accomplishes higher resolution and correspondingly higher gain arrays implementation, which is a desirable and useful property for both sensors (e.g. radar) and communications systems.

Metamaterials

In general a number of properties of meta-materials support the functions required for beam-forming, including application of time-delay or phase shift, creation of a frequency selective response, application of a real amplitude weighting (attenuation), and signal summation. The primary means of accomplishing these effects or function is to design elements which comprise the meta-material in order to control the index of refraction and impedance characteristics which govern the propagation of waves within the material. Normal materials have both a positive dielectric permittivity and magnetic permeability, they are referred to as double positive or DPS materials, however metal-materials can have negative permittivity, or negative permeability, or both. The latter is referred to as a double-negative or DNG material. References [3, 4, 5, 6], provide additional background on useful applications of such materials to antenna beam-forming and approaches for implementation of meta-material antenna array systems.

Properties of Metamaterials

DNG can provide phase compensation due to their negative index of refraction. This is accomplished by combining a slab of lossless DPS material with a slab of lossless DNG metamaterial. DPS has a positive index of refraction, while the DNG has a negative refractive index. As this wave propagates through the first slab of material a phase difference emerges between the exit and entrance faces. As the wave propagates through the second slab the phase difference is significantly decreased and even compensated for. Therefore as the wave can be made to propagate through both slabs with a phase difference is equal to zero, a negative phase, or a positive phase, according to geometry and design. With this approach a phase-compensated, waveguiding system can be produced. By stacking slabs with various characteristics, the phase compensation can be adjusted. By making the micro (or nano-scale or other scale) elements active and addressable, the characteristics of the material can be adjusted electronically. Furthermore, by changing the index of any of the DPS-DNG pairs, the speed at which the beam enters the front face, and exits the back face of the entire stack-system changes. A volumetric, a low loss, time delay transmission line can thus be realized for a given purpose. It is more compact in size, it can achieve positive or negative phase shift while occupying the same short physical length and it exhibits a linear, flatter phase response with frequency, leading to shorter group delays. It can work in lower frequency because of high series distributed-capacitors and has smaller plane dimensions than its equivalent coplanar structure. A left-handed transmission line comprises a high-pass filter with phase advance, while right-handed transmission lines are low-pass filters with phase lag. This configuration is designated composite right/left-handed (CRLH) metamaterial.

This method of phase compensation can also be applied to construct micro-sized cavity resonators which can also be used to control amplitude of transmission and localized frequency response of the material.

Metamaterial Lens

A metamaterial lens, often found in metamaterial antenna systems, is an efficient coupler to external radiation, focusing radiation along or from a microstrip transmission line into a transmitting and receiving component or components. Such a lens and transmission line may be used to create signal summation with or without associated phased shifts or time delays.

Lumped Circuit Elements

Often, because of the goal that moves physical metamaterial inclusions (or cells) to smaller sizes, discussion and implementation of lumped LC circuits or distributed LC networks are often examined. Lumped circuit elements are microscopic (or even nano-scale or smaller) elements that approximate their larger component counterparts. For example, circuit capacitance and inductance can be created with split rings, which are on the scale of nanometers at optical frequencies.

Negative Refractive Index Metamaterials Supporting 2-D Waves

Transmission lines periodically loaded with capacitive and inductive elements in a high-pass configuration support certain types of backward waves. Additionally, planar transmission lines are naturally support 2-D propagation. A notable property of this type of network is that there is no reliance on resonance; the ability to support backward waves implies negative refraction.

Frequency Selective Surface (FSS) Cavity Resonators

Frequency selective surface (FSS) based metamaterials utilize LC equivalent circuitry configurations, which can be comprised of tunable and/or active components. Using FSS in a cavity allows for miniaturization, decrease of the resonant frequency, lowers the cut-off frequency and smooths transition from a fast-wave to a slow-wave in a waveguide configuration. Accordingly, FSS resonators can comprise a set of small, sensitive antenna elements, the location of which can be selected by switching, and the sensitivity of which adjusted by tuning of the resonance parameters for each resonator.

To accomplish directional reception for radio frequency signals, phased-array antennas make use of Fourier Transform, or equivalently "Butler-Matrix" beam-forming, is often utilized along with planar geometries of antenna elements. Each row of such a transform constitutes a vector of complex numbers each having a real magnitude and a phase. These magnitudes and phases correspond to operations applied to the outputs of a plurality of antenna elements, each of which is phase-shifted and amplitude-weighted before summing, in order to form a "beam" which directionally filters out received signal waves arriving from a particular direction. The general procedure is to apply phase-shifts so as to un-do the phase-shift of the signal as it propagates across the array, and apply real amplitude weighting so as to control the beam response in directions other than the desired "look direction". This type of antenna array with associated beam-forming is referred to as a "phased-array antenna". When the array is made small as a ratio to the wavelength of the signal being received, the directionality of the reception normally diminishes in accordance with the theory of wave diffraction, a problem which is solved by use of Hermetic Transforms. The Hermetic Beam-Forming process does also utilize such a procedure, with specific phase-shifts and weights generated using a specific algorithm as described in patents by Woodsum [1, 2]. The inverse process is followed in order to create a directional beam of transmitted energy (e.g. radio-frequency or acoustic waves). Hermetic Transform Beam-Forming is not at all restricted to planar or any other geometric arrangement of antennas, this example is used merely to illustrate an analogy. Because of the spatial oversampling in Hermetic Arrays, an array having N elements will have a much smaller physical size, while retaining a narrow beam-width. The beam-widths of Hermetically beam-formed phased arrays can be much less than the diffraction limit would allow.

For case of transmit beam-forming, a given signal, which can be used to carry information, is used to create a plurality of similar signals by applying different phase-shifts and amplitude weights to the one original signal. Each of these phase-shifted, amplitude weighted signals are fed to antenna elements individually. The narrow beams are generated on transmit via interference between waves propagating from each antenna element.

Exemplary embodiments of the present disclosure result in a significant increase in the performance of miniaturized (electrically small) antenna systems. The increased performance is characterized in terms of both the increased spatial resolution (reduced beam-width), the capacity for interference rejection, and the spatial gain against ambient noise arriving from various directions, for example non-directional, isotropic noise.

Exemplary embodiments can incorporate meta-materials, materials engineered to employ a multitude of structures or devices much smaller than the pertinent wavelength, normally on the microscopic or even nano-scale, in order to produce unusual material properties that would be difficult or even impossible to accomplish using normally occurring materials. Established lithographic techniques, as are utilized in electronic "chip" manufacturing, can be used to print such metamaterial elements on a PC Board, making them potentially very cost-effective. Some applications for the disclosure would be: wireless communication, e.g. cellular phones and Wi-Fi, space communications, and navigation (e.g. GPS). Other applications can be based on acoustic meta-materials (e.g. medical ultrasound).

Several exemplary embodiments as described below make use of metamaterial components, phased-array beam-forming, including Hermetic Transform beam-forming, as well as holographic (interferometric) antennas. Additional background on is described in [5].

FIG. 1 shows a phased-array receive beam-forming system 100 according to an exemplary embodiment. In the diagram, the output of each antenna element 101 feeds a device 102 which provides an appropriate phased-shift and amplitude weighting so that the sum of the phase-shifted, weighted channel signals is responsive primarily to waves in a particular look direction (beam-steer angle).

The summation network 103 seen in the diagram actually performs coherent summation so as to preserve the signal characteristics for use in down-stream signal selection and matched-filtering (for the case of a radar signal) or demodulation (for the case of a communications signal). The plurality of N elements (e.g., N=4 in the FIG. 1 example) provides a single receive beam pointed in a single look direction for a particular set of phase-shifts and amplitude weights $[\theta_1\text{-}\theta_4, a_1\text{-}a_4]$. Exemplary embodiments use a Hermetic Transform based phased-array beam-former, e.g., the set of weights and phase-shifts that are contained within corresponding vector of complex numbers that comprise one row of the Hermetic Transform, each row corresponding to a look direction, and each column corresponding to a particular antenna element. Treating the signal as complex (e.g. dealing with the Hilbert Transform or quadrature-representation of the real signal data), the formation of a single beam data stream can be accomplished by taking the dot product of the complex weight vector with the antenna data vector data stream. These function may be accomplished using either digital or analog (e.g. via metamaterial circuit) means.

In FIG. 1, a modern communications system could digitally sample the single beam-signal after beam-formation, thereby gaining a reduction in the required amount of digital hardware required by making use of analog metamaterial elements.

Reviewing the equations used to develop the Hermetic Transform, such transform $\underline{H}$ is derived from a manifold matrix as contained in Woodsum [1-2] is $$\underline{H} = \underline{\Sigma}^H \underline{W}$$

The manifold matrix $\underline{\Sigma}$ is the complex array response, as set of response from the array (vector) of elements to wave arrivals from a set of directions, determined by modeling or from measurement. Here $\underline{W}$ is a complex matrix obtained by solving the following equation in a least-squares or minimum norm sense (superscript H indicates the Hermitian conjugate, complex conjugate transpose operation).

$$\underline{\Sigma}^H \underline{W} \underline{\Sigma} = \underline{I}$$

where $\underline{I}$ is the identity matrix; $\underline{I}$ can be replaced with some other chosen response. An example solution is given by the following mathematical expression:

$$\underline{W} = [\underline{\Sigma}\underline{\Sigma}^H]^\# \underline{\Sigma} (\underline{I}) \underline{\Sigma}^H [\underline{\Sigma}\underline{\Sigma}^H]^\#$$

For the two-dimensional versions of the transform, a signal manifold is constructed from a set of rectangular matrices which are reshaped to form the columns of the $\underline{\Sigma}$ matrix; these are re-shaped upon reconstruction in the inverse fashion in order to go back to the spatial domain.

Other equivalent methods for obtaining $\underline{H}$ are disclosed by Woodsum [1-2]. In arrays for reception, the Hermetic Transform matrix, from which the complex weights, or equivalently phase-shift and amplitude weighting derived, may optionally include a noise conditioning matrix $\underline{K}$. This matrix normalizes for the effect of white, spatially uncorrelated noise, to the extent that such noise is present and significant in its effect.

$$\underline{H} = \underline{\Sigma}^H \underline{W} \underline{K}$$

The equation for the noise conditioning matrix $\underline{K}$ is as follows:

$$\underline{K} = \underline{R}_{\Sigma\Sigma} [\underline{R}_{NN} + \underline{R}_{\Sigma\Sigma}]^\#$$

where $\underline{R}_{NN}$ is the internal self-noise covariance, and $\underline{R}_{\Sigma\Sigma}$ s the scaled manifold covariance (=c $\underline{\Sigma}\,\underline{\Sigma}^H$). In terms of the diagram above, the phased shifts are the arguments (phases) of the Hermetic Transform row vectors, while the amplitude weightings are the corresponding magnitudes.

Exemplary embodiments accomplish the major functions involved in FIG. 1 using metamaterials constructed to specifically perform these functions while specifically applying the Hermetic Transform phase-shifts and amplitude weightings. Specifically, according to an exemplary embodiment, FSS resonators are utilized to select regions of the antenna for frequency selective operation. The strength of the resonance is adjusted by tuning, with some residual phase-shift effect that is then compensated for. Left-Handed and Right-Handed materials are utilized to further compensate for the resonance phase-shift and then to apply specific beam-forming phase-shifts. Combinations of LH and RH materials are utilized to create wave-guiding and lensing regions to direct and sum (focus) the resulting wave signals so as to complete the operations of Hermetic Transform Beam-Forming. A number of geometric arrangements of these basic building blocks are possible as illustrated, for example, in the exemplary embodiments shown in FIG. 2.

Figure 2:
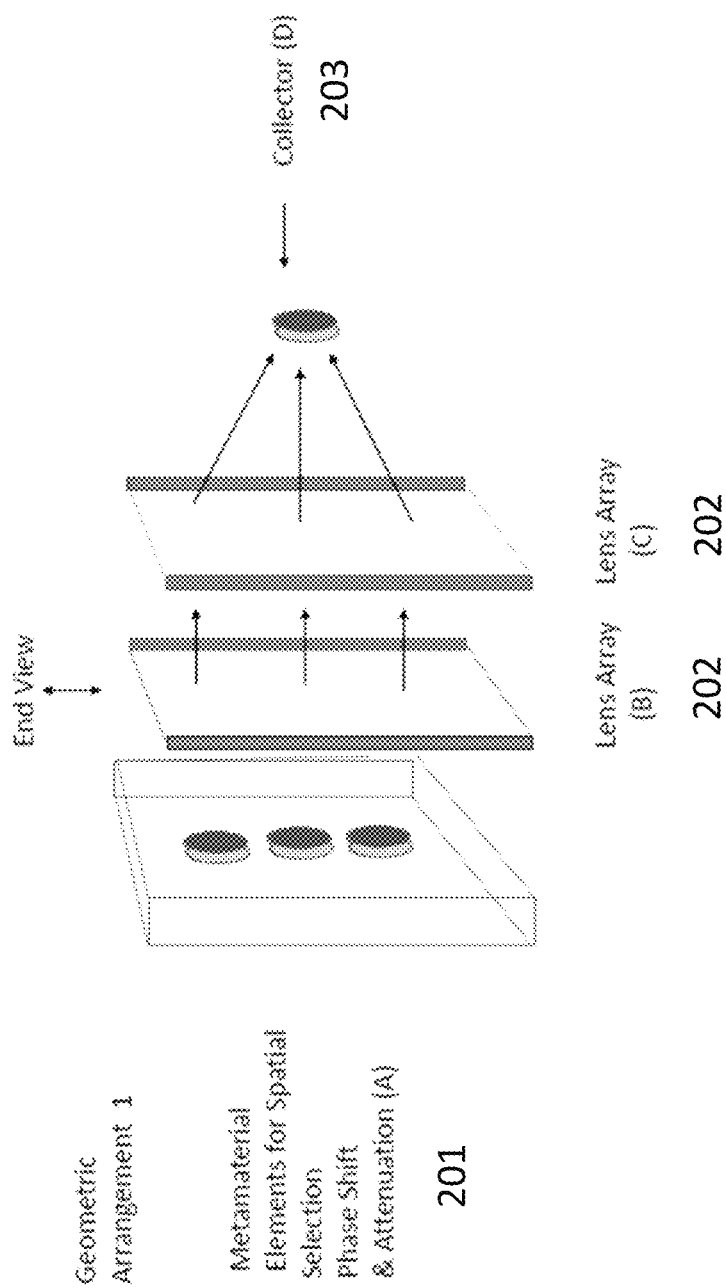
FIG. 2 shows a direct form implementation of a beam-forming system according to an exemplary embodiment.

FIG. 2 shows a direct form implementation of a beam-forming system according to an exemplary embodiment. Starting from the left, particular FSS resonator regions 201 of the meta-material antenna surface are switched on, with the resonance frequency chosen to lie near the center frequency of the signal being received. The tuning of these resonators 201 adjusts the strength of the signal weighting, meta-material phase-shifts immediately after adjust the phase so that each channel acquires its appropriate Hermetic Transform weight for the desired beam look direction. The index of refraction can be controlled in a nearly arbitrary fashion and the direction of motion of the wave(s) will also be controlled, according to the refractive index (Snell's law, Eikonal paths). Lensing/waveguiding 202 is utilized to direct the resulting weighted, phase-shifted signals to a collector device 203 where the channel signals are thus summed. The signal from the collector can subsequently be digitized and processing can proceed thereafter.

Figures 3A, 3B, 3C:
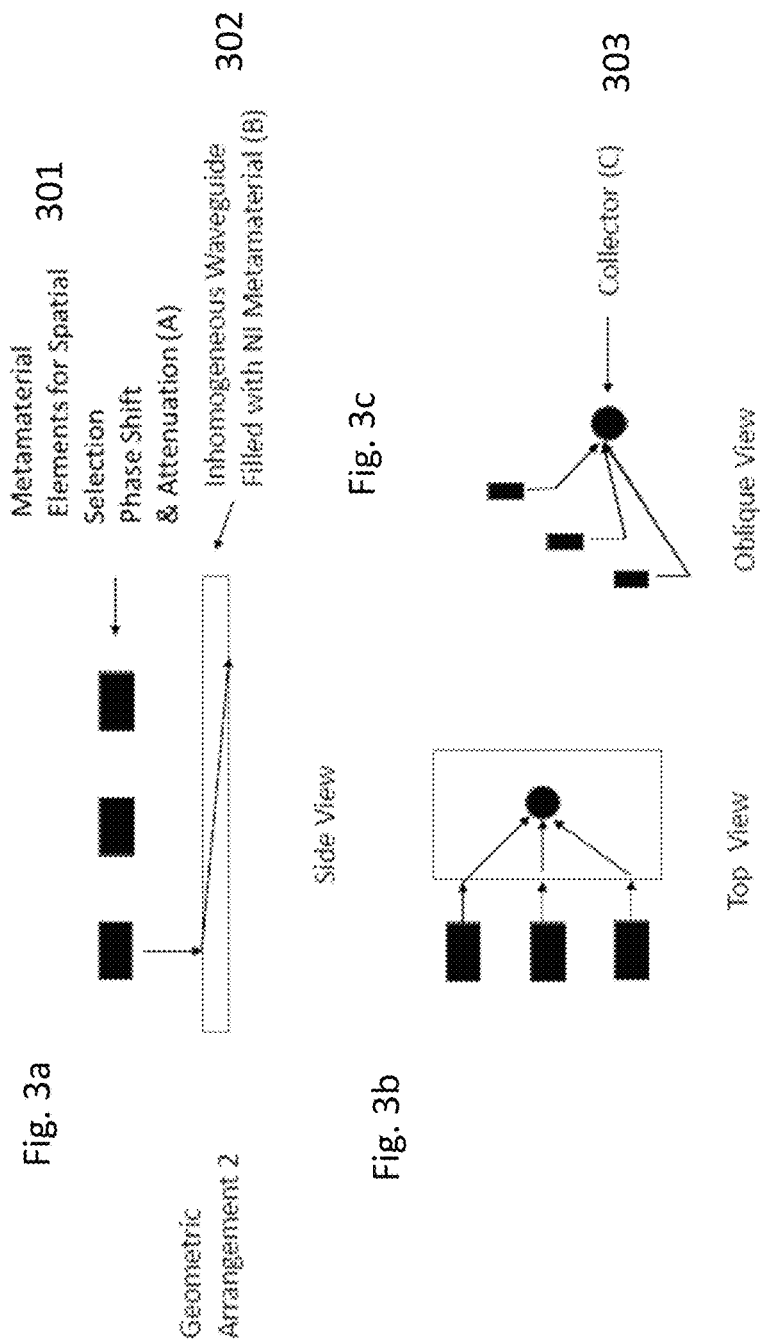
FIGS. 3a-3c illustrates examples of unique properties of the meta-materials that allow the creation of essentially flat antennas because the net refractive index can essentially be made to be nearly anything by combination of LH and RH materials according to an exemplary embodiment.

FIGS. 3a-3c illustrate examples of unique properties of the meta-materials that allow the creation of essentially flat antennas because the net refractive index can essentially be made to be nearly anything by combination of LH and RH materials according to an exemplary embodiment. In particular, FIG. 3a shows a side view of metamaterial elements for spatial selection phase shift and attenuation and an inhomogeneous waveguide filled with NI metamaterial, FIG. 3b shows a top view, FIG. 3c shows an oblique view according to an exemplary embodiment.

In FIGS. 3a-3c, several views of this process are presented. First, from the FSS elements 301, channel signals are corner-turned (z-axis) to direct the energy into a waveguide 302 constructed with metamaterials. Subsequently, the signals propagation within the waveguide 302 (shown, parallel to the x-y plane) and are refracted to a focus at a collector device 303 (point C), at which point the signal can be digitized and processed thereafter.

The ability to control frequency selectivity (FSS) and strength of resonant response, to control phase as and to control the direction of motion of the resulting wave signals, can be used to construct any number of arrangements for particular utility applications.

Hermetic Transform Beam-Formed Metamaterial Transmitting Arrays

Figure 4:
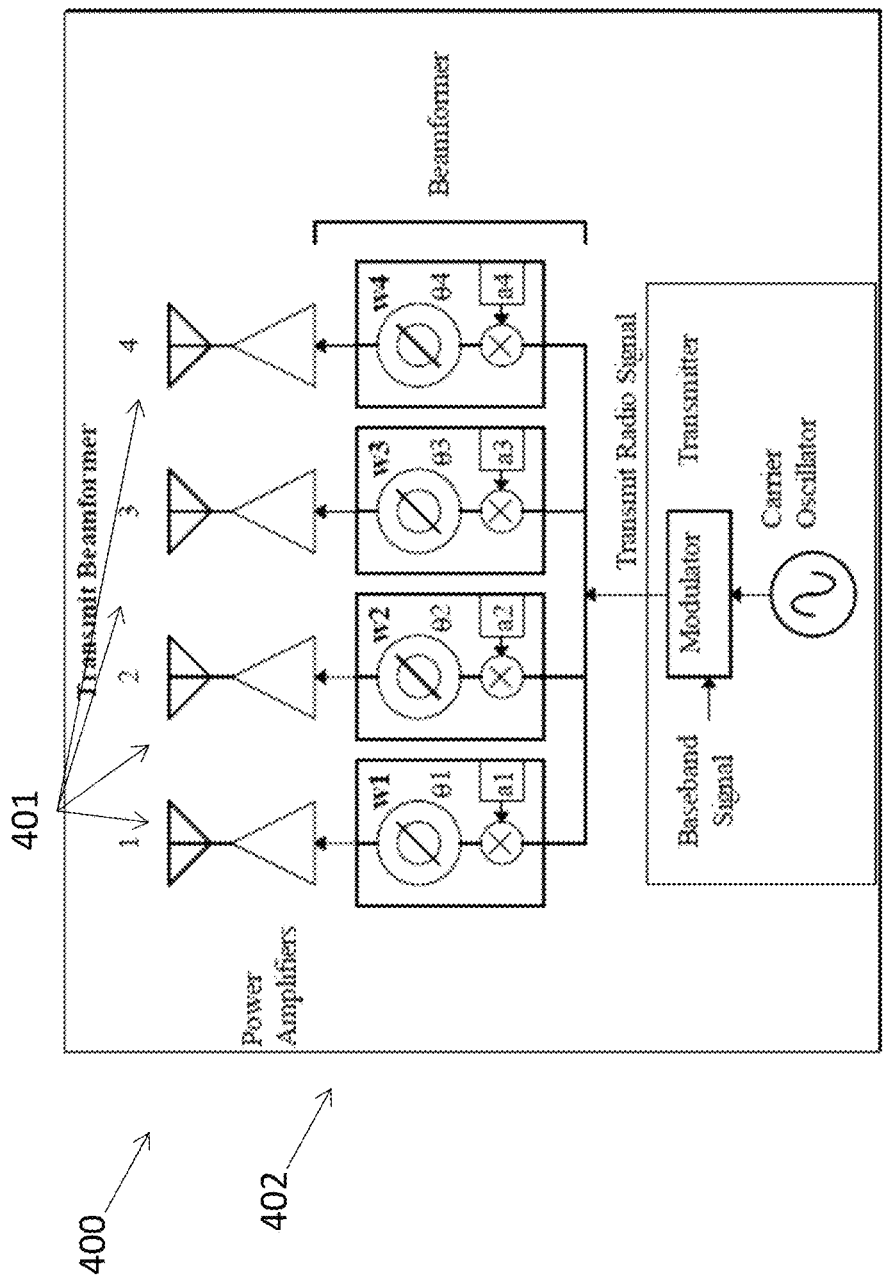
FIG. 4 shows a beam-forming phased-array antenna system according to an exemplary embodiment.

FIG. 4 shows a beam-forming phased-array antenna system 400 according to an exemplary embodiment. A signal to be transmitted in a particular direction is converted to a plurality of (N) phase-shifted, amplitude weighted signal channels which are each amplified and fed to plurality of N transmitting antenna elements 401. In the diagram, N=4. The antenna elements 401 may be elementary conducting elements for sensing the Electric or E-field impinging on the array, while the phase shifts and amplitude weights may be applied through special circuits 402 which are designed to apply a specific frequency, amplitude, and phase response at the particular frequencies of interest.

By selection of appropriate phase-shifts and weights, according to the concept of the Hermetic Transform, transmitting beams can be made significantly narrower than the diffraction limit, in a fashion similar to that of Hermetic Transform beam-forming for reception. A general result has been obtained as specified in the patents by Woodsum [1,2] for the ideal complex weights for transmission.

We recognize that the far-field pattern is the spatial Fourier transform of the excitations at the array. A result of antenna theory is the following:

$$\vec{E}(\vec{r}) \approx \frac{-j\omega\mu}{4\pi r} e^{-jkr} \iint_S \vec{J}_S\, e^{jk(\vec{r}'\cdot\vec{r})} ds'$$

Integral Acts Like Matrix Multiply

Current Excitation Vector

Fourier Transform Matrix elements Resulting From Green's Function

Here E is the electric field vector at the spatial point r generated by a radiating antenna w is the radian frequency of electromagnetic field, Js is the current vector excitation at the antenna, the set of points r' comprise the radiating antenna surface, and dS' is an element of volume on the radiating antenna surface. The double integral represents the antenna pattern, which is seen to the spatial Fourier Transform of the current excitation in wave-vector space. The Hermetic Transform principle is to design the excitation so as to create the desired beam shape.

This principle is also recognized to associate with the principles of Holography and Holographic Antennas. To obtain the required excitations one first solves the equation:

$$\Sigma^H W F = \beta$$

$$W = (\Sigma\Sigma^H)^\# \Sigma \beta (F^H)(FF^H)^\#$$

Where F is the Fourier Matrix derived from the radiative Greens' function, $\Sigma^H$ corresponds to the excitations obtained by reciprocity with the array receiving manifold, and W is the complex weight matrix used to produce a set of excitations that produce the response β. For maximum directivity, $$\beta = cl.$$

Figure 5:
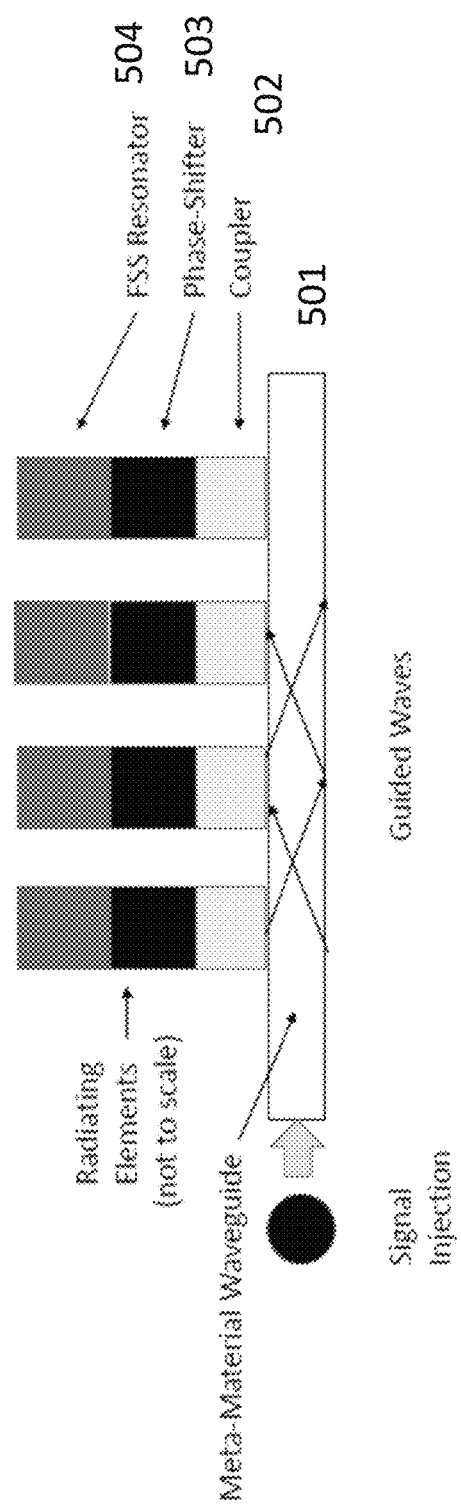
FIG. 5 shows a meta-material Hermetic Transform, Transmit Beam-Forming Antenna System according to an exemplary embodiment.

One exemplary embodiment of a meta-material Hermetic Transform, Transmit Beam-Forming Antenna System is shown in FIG. 5, which is not to scale. The figure shows a metamaterial waveguide 501, such that the speed of propagation within the waveguide can be controlled by adjusting the active components or by tuning the metamaterial elements. The signal to be transmitted is injected into the waveguide, and tunable couplers 502 are used to select points where radiation is allowed to leak from the waveguide. Phase-shifts are introduced by metamaterial elements 503 and Frequency-Selective resonators 504 are utilized as radiative antennas. Active gain can be applied to further increase power output. The radiation presented at the surface of the antenna, as a boundary condition resulting in the launching of electromagnetic (RF) waves, is designed through the above means, to have at each point, the precise amplitude and phase required in order to create the desired narrow-beam antenna pattern.

The process for Hermetic Transform design allows for the generation of patterns of nearly arbitrary form, with respect to energy directing main lobe(s) as well as pattern side lobes and nulls, such process being reflected in an off-line calculation of complex weights, implemented through the control of the metamaterial device array, in order to create the desired antenna characteristic. Additional background is provided in Woodsum [1, 2, 7].

Figure 6:
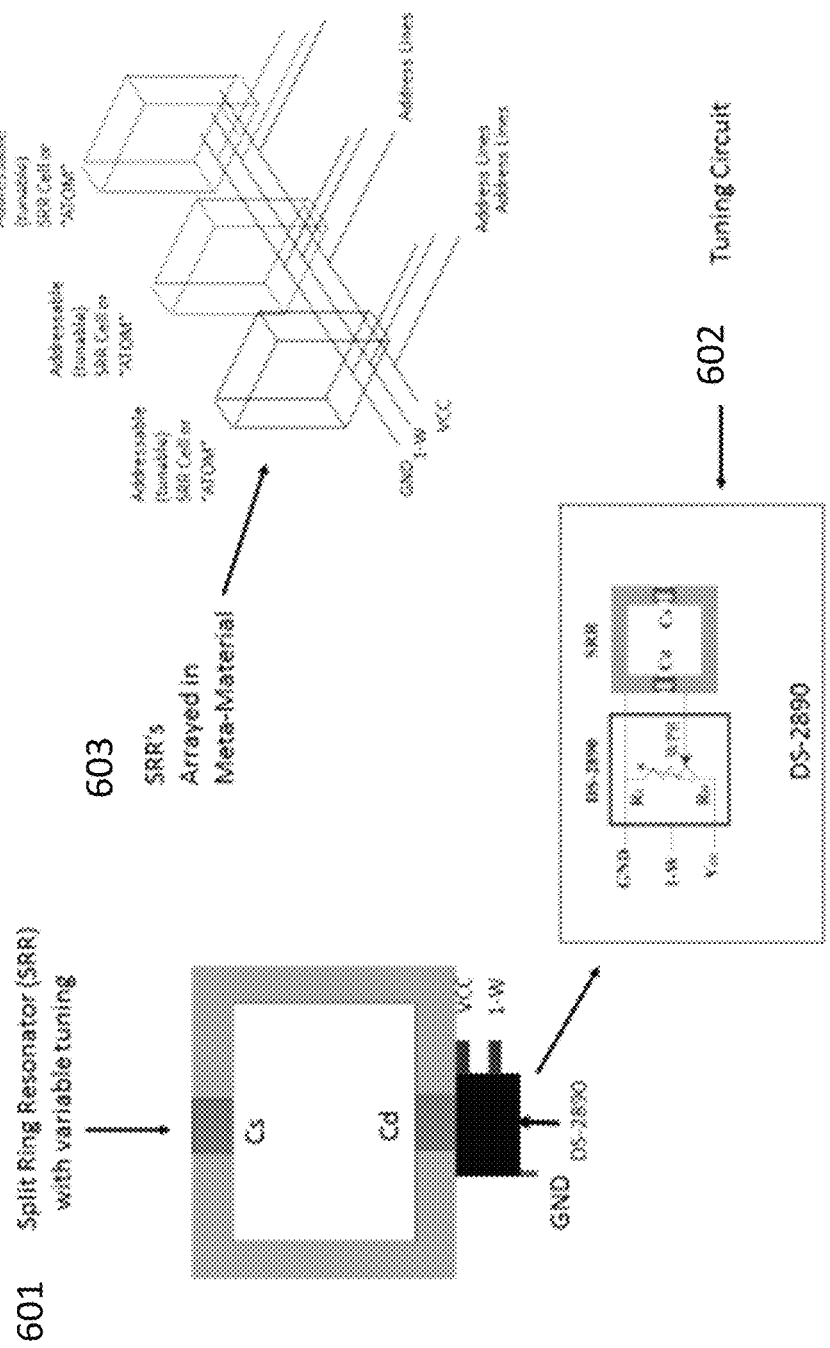
FIG. 6 shows a method of construction of materials for a controllable metamaterial antenna according to an exemplary embodiment, as well as a means of control of the material through control of its constituent "cells' or "atoms" according to an exemplary embodiment.

It is clear that the characteristics may be fixed or variable, according to the manner in which the control signals are applied. FIG. 6 shows a fully controllable embodiment of a transmitting array according to an exemplary embodiment. FIG. 6 shows a method of construction of materials for a controllable metamaterial antenna according to an exemplary embodiment, as well as a means of control of the material through control of its constituent "cells' or "atoms" according to an exemplary embodiment. The example utilized shows a material constructed from a plurality of magnetic Split-Ring Resonator (SRR) cells 601 (or "atoms"), each of which has variable tuning which can be adjusted using a digital potentiometer, through individual address lines. Additional background on SRR cells can be found here [8]. The SRR is taken for purposes of illustration because it can be used in metamaterial antennas. An array 603 of such devices comprises a synthetic material having an index of refraction that can be adjusted, as well as frequency, amplitude, and phase response to propagating waves. By properly tuning the devices using a tuning circuit 602 through available address lines, the medium properties can be locally tuned to create resonant structures, phase-shifters, and attenuators in order to applied the desired effects to the propagating wave in the material and create desired antenna patterns through Hermetic Transform Beam-Forming. While this is the objective of one or more exemplary embodiments, this by no means precludes the application of exemplary embodiments to other domains where the creations of Hermetic Transforms using metamaterials might have utility, for example the cases of Hermetic Transform Time Correlation, signal Filtering via Hermetic Transforms, and the implementation of Hermetic Transforms for demodulation of Hermetic OFDM communications signals.

REFERENCES

[1] "Beam-forming Devices and Methods," Harvey C. Woodsum, U.S. Pat. No. 8,064,408.
[2] "Beam-forming Devices and Methods," Harvey C. Woodsum, U.S. Pat. No. 8,559,456.
[3] "Sidelobe Canceling for Optimization of Reconfigurable Holographic Metamaterial Antenna" Johnson et al., IEEE Transactions on Antennas and Propagation (2014)
[4] Wang, "Metamaterial-Enabled Compact Wideband Tunable Phase Shifters", U.S. Pat. No. 8,680,945
[5] Metz, "Phased-Array Metamaterial Antenna System", U.S. Pat. No. 6,958,729
[6] Grummet, "Aircraft Skin Antenna", U.S. Pat. No. 4,716,417
[7] H. C. Woodsum and C. M. Woodsum, "Optimized Hermetic Transform Beam-Forming of Acoustic Arrays via Cascaded Spatial Filter Arrangements Derived using a Chimerical Evolutionary Genetic Algorithm", Proceedings of the International Congress on Acoustics, ICQ-13, June 2013, Montreal Canada.]
[8] Thomas H. Hand, Controllable Magnetic Metamaterial Using Digitally, Addressable Split-Ring Resonators", IEEE Antennas and Wireless Propagation Letters, Vol. 8, 2009 (262-265)

The invention claimed is:

1. A receiver comprising:
a plurality of first metamaterial circuit elements configured as an array to receive a signal, where the plurality of first metamaterial comprise a plurality of circuit elements arranged with spacings much less than one half of the signal wavelength so as to provide an antenna array that is highly oversampled relative to the spatial Nyquist criterion;
a plurality of second metamaterial circuit elements configured to perform amplitude scaling and phase-shifting of output signals from the antenna array in accordance with amplitudes and phases for performing a Hermetic Transform; and
a plurality of third metamaterial circuit elements configured to perform a summation on amplitude-scaled and phase-shifted outputs derived from a Hermetic Transform Matrix so as to produce the effect of a Hermetic Transform application to the signal and to provide a beam-formed signal channel for each row of the Hermetic Transform Matrix.

2. The receiver according to claim 1, wherein the plurality of second metamaterial circuit elements comprise a plurality of phase shifters for performing phase shifts and a corresponding plurality of amplitude scalers for performing amplitude scaling, both phase-shifting and amplitude scaling occurring in series to accomplish the combined effect of which corresponds to the hermetic transform and configured to switch in and out specific circuit elements to allow different Hermetic Transforms to be applied to antenna signal channel data.

3. The receiver according to claim 1, wherein the plurality of third metamaterial circuit elements comprises at least one of a metamaterial lens or reflector.

4. The receiver according to claim 1, wherein the signal is an RF signal.

5. The receiver according to claim 1, wherein the signal is an acoustic signal.

* * * * *